US008557011B2

(12) United States Patent
Bouteiller

(10) Patent No.: US 8,557,011 B2
(45) Date of Patent: Oct. 15, 2013

(54) MARKED HONEYCOMB STRUCTURE

(75) Inventor: Bernard Bouteiller, L'isle sur la Sorgue (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/382,969

(22) PCT Filed: Jul. 9, 2010

(86) PCT No.: PCT/IB2010/053160
§ 371 (c)(1),
(2), (4) Date: Feb. 9, 2012

(87) PCT Pub. No.: WO2011/004351
PCT Pub. Date: Jan. 13, 2011

(65) Prior Publication Data
US 2012/0125468 A1    May 24, 2012

(30) Foreign Application Priority Data
Jul. 9, 2009    (FR) ...................................... 09 54791

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| 3,853,485 | A   | * | 12/1974 | Hogan .......................... 502/300 |
| 4,740,408 | A   | * | 4/1988  | Mochida et al. .............. 428/116 |
| 7,410,929 | B2  | * | 8/2008  | Ichikawa et al. .............. 502/300 |
| 8,153,072 | B2  | * | 4/2012  | Klingberg ..................... 422/177 |
| 2004/0037754 | A1 | * | 2/2004 | van Setten et al. ............ 422/177 |
| 2008/0264012 | A1 | * | 10/2008 | Bardon et al. ............... 55/385.3 |

* cited by examiner

*Primary Examiner* — Amber Orlando
(74) *Attorney, Agent, or Firm* — Cooper Legal Group, LLC

(57) ABSTRACT

The invention relates to a honeycomb structure including a set of adjacent channels, each channel being in communication with upstream and downstream surfaces, respectively, via upstream and downstream openings, such that said set of channels forms cross-sectional upstream and downstream patterns on said upstream and downstream surfaces, respectively. According to the invention, at least one of the upstream and downstream surfaces has an error-proofing mark extending over fewer than 50 channels and making it impossible to completely stack any one of the upstream and downstream patterns onto the other, the outer perimeter of the upstream and/or downstream pattern being symmetrical or having an asymmetry that extends over fewer than 10 channels. The invention can be used in the filtration of particles contained it the exhaust gases of internal combustion engines, in particular diesel engines.

15 Claims, 5 Drawing Sheets

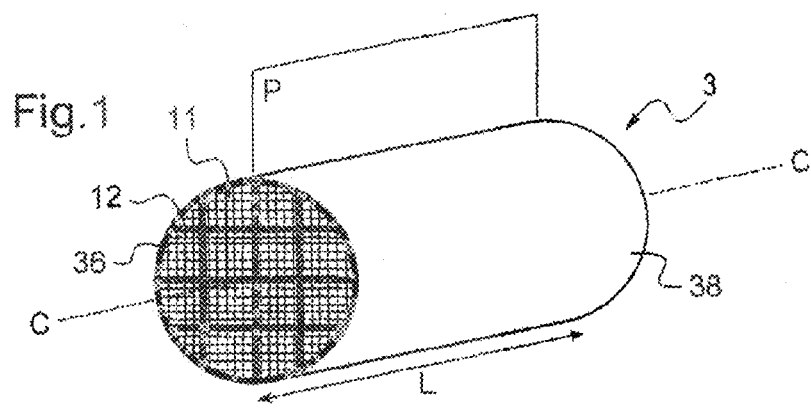
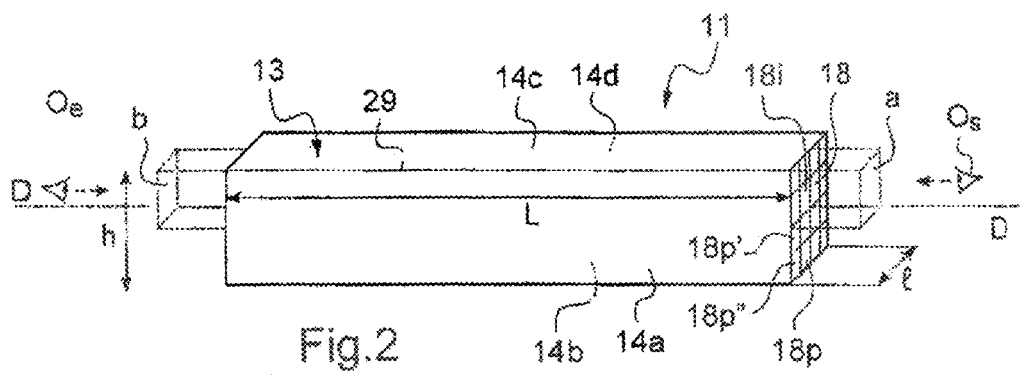
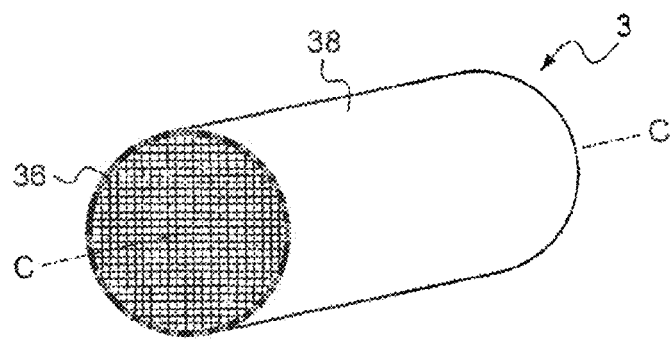

MARKED HONEYCOMB STRUCTURE

TECHNICAL FIELD

The invention relates to a honeycomb structure, especially for filtering the particulates contained in the exhaust gas of internal combustion engines, in particular diesel engines. The relates to a filter body, whether monolithic or assembled, comprising at least one honeycomb structure according to the invention and to a method of manufacturing such a filter body.

The invention also relates to a the for extruding a honeycomb structure according to the invention and to a method of manufacturing a honeycomb structure according to the invention.

TECHNOLOGICAL BACKGROUND

Before being discharged into the open air, the exhaust gas may be purified by means of a filter body, such as those shown in FIGS. 1, 3 and 4, known from the prior art.

A particulate filter 1 conventionally comprises at least one generally cylindrical filter body 3 of longitudinal axis C-C, of length typically between 10 and 30 cm, which is inserted into a metal can 5.

To benefit from good thermomechanical resistance, in particular during the regeneration phases, it is advantageous to manufacture this filter body by assembling a plurality of what are called "unitary" filter blocks 11 by means of joints 12, followed by machining. The filter body is then an "assembled" filter body, as shown in FIG. 1. FIG. 2 shoals an example of a unitary filter block of axis D-D, of length "L", of width "l" and height "h".

The filter body 3 may also be monolithic, that is to say made as a single piece, with no joints, as shown in FIG. 3.

Conventionally, to manufacture a unitary filter block or a monolithic filter body, a ceramic (cordierite, silicon carbide, alumina, mullite, silicon nitride, a silicon/silicon carbide mixture, etc.) is extruded through an extrusion the so as to form a honeycomb preform.

To manufacture a unitary filter block 11, the extrusion the is conventionally shaped so that the lateral surface 13 of the preform has four substantially identical lateral faces 14a-d, defining for example a parallelepipedal preform of square or rectangular or even hexagonal cross section. The width "l" of a lateral face of such a preform is typically between 30 mm and 100 mm.

To manufacture a monolithic fitter body, the extrusion die is conventionally shaped so that the preform has the form of a cylinder of circular or ellipsoidal cross section.

The preform is then sintered to form a honeycomb structure.

A "honeycomb" configuration means that the preform and the porous structure comprising a set of adjacent channels 18, or "duct", so as to form, in cross section, a checkerboard pattern.

The channels 18, each bounded by a lateral wall 22, are generally straight, of substantially square cross section, and extend parallel to one another. In one cross section, they thus form rows 19 and columns 20. The thickness of the lateral was may especially be between 180 and 500 µm. The cross section of the channels may especially be between 0.4 and 9 mm².

Each channel of the preform emerges via an upstream opening 24e on an upstream face 26e, or "intake face", and via a downstream opening 24s on a downstream face 26s, or "discharge face".

The terms "upstream pattern" and "downstream pattern" refer to the images of the upstream and downstream faces, respectively, seen in a direction of observation perpendicular to these faces, in FIG. 2, the observer $O_e$ observes the upstream pattern and the observer observes the downstream pattern.

When all the channels have the same length and the upstream and downstream faces are perpendicular to the direction of the channels at the upstream and downstream faces, and before the channels are plugged, the upstream and downstream patterns thus correspond to the cross section, that is to say perpendicular to the direction of the channels, at the upstream and downstream faces respectively.

It is conventional to distinguish interior channels 18i from peripheral channels 18p.

Unlike the interior channels 18i, the lateral wall of the peripheral channels 18p is partly exposed to the outside of the honeycomb structure. In a honeycomb structure having longitudinal edges 29, and especially in a parallelepipedal honeycomb structure, a distinction is made, among the peripheral channels 18p, between the corner channels 18p" and the lateral channels 18p'. The corner channels 18p" extend along said longitudinal edges. The lateral channels 18p' are, unlike the corner channels 18p", positioned along only one lateral face 14a-d of the honeycomb structure.

A honeycomb structure intended for manufacturing a filter body is then alternately plugged on the upstream face 24e or on the downstream face 24s by upstream plugs 30s and downstream plugs 30e, respectively, as is well known, so as to form what is called "outlet channels" 18s and "inlet channels" 18e, respectively (see FIG. 4). What is then obtained is a "filter" block.

At the opposite ends of the outlet channels 18s and net channels 18e to the upstream 30s and downstream 30e plugs, respectively, the outlet channels 18s and the net channels 18e open to the outside via downstream openings, called "outlet openings 32s", and via upstream openings, called "inlet openings 32e", respectively, which extend over the downstream face 26s and upstream face 26e, respectively.

Thus, the inlet and outlet channels define net and outlet chambers 34e and 34s, respectively, each bounded by a lateral wall 22, a closure plug and an opening that opens to the outside. Two adjacent net and outlet channels are in fluid communication via their common lateral wall.

To manufacture an assembled filter body, the unitary filter blocks 11 are assembled together by bonding them by means of joints 12 made of a ceramic jointing cement interposed between their facing adjacent faces. The jointing cement generally consists of silica and/or silicon carbide and/or aluminum nitride. Preferably, the jointing cement is substantially impermeable to the exhaust gas to be filtered. The jointing cement may have a thermal conductivity of at least 0.1 W/m·K between 20° C. and 800° C. so as to limit the thermomechanical stresses. Typically, the average thickness of a joint 12 is between 0.3 and 4 mm.

The jointing cement may be applied over the entire area of a lateral face of a unitary filter block or over only part of this lateral face. In the latter base in particular, all the lateral faces of the unitary filter block cannot always be assembled indiscriminately to any lateral face of another unitary filter block. In other words, it may be necessary to identify one or more of the lateral faces of the unitary filter blocks so as to ensure that the lateral faces bonded together properly correspond. A mark may be printed for this purpose on the lateral faces of the unitary filter blocks.

The assembly thus formed may then be machined so as to obtain a shape matched to the can 5, for example for manufacturing a cylindrical filter body of circular cross section.

Generally, a peripheral coating 36, also called an "external coating" or "coating" made of a coating cement which is thermally insulating and impermeable to the exhaust gas, is applied to the lateral surface 38 of the monolithic or assembled filter body.

The assembled or monolithic filter body 3 may then be inserted into the can 5, a peripheral joint 40, impermeable to the exhaust gas, being placed between the lateral surface 38 of the filter body and the can 5.

The stream F of exhaust gas between the filter body 3 via the net openings of the net channels passes through the lateral filtering was of these channels before rejoining the outlet channels, and then escapes to the outside via the outlet openings.

After a certain period of use, the particulates, or "soot particles", which have accumulated in the net channels of the filter body 3 increase the pressure drop due to the filter body 3 and thus impair the performance of the engine. For this reason, the filter body must be regularly regenerated, for example every 500 kilometers.

The regeneration or "declogging" operation consists in oxidizing the soot particles by heating them to a temperature enabling them to be burnt off.

During the regeneration phases, the temperature differs along the zones of the filter body 3 and does not vary uniformly. This is because the exhaust gas transports the thermal energy released by burning the soot to the downstream end. In addition, the soot is not deposited uniformly in the various channels, it accumulating for example preferentially in that zone of the filter body close to its longitudinal axis, also called the "core" of the filter body. The combustion zones are therefore not uniformly distributed within the filter body 3. The combustion of the soot therefore causes a temperature rise in the core of the filter body greater than that in the peripheral zones. Finally, the peripheral zones of the filter body 3 are cooled, through the metal can 5, by the surrounding air.

The inhomogeneity of the temperatures within the filter body 3 generates local stresses of large amplitude that may result in local ruptures or cracks. The filter body 3 must therefore be changed, the spent filter body preferably being recycled.

To increase the lifetime of the filter bodies, it is also possible to carry out thorough cleaning so as to clear the net channels of the residual ash. This cleaning operation, conventionally called "ash cleaning" is especially darned out for the filters intended for heavy duty vehicles. It conventionally involves removing the filter body from the exhaust line and using a cleaning apparatus external to the vehicle for extracting the residues from the filter.

Whether for an external regeneration or recycling operation, it is necessary for the upstream and downstream faces of the filter body to be able to be rapidly identified.

There is therefore a need for a honeycomb structure that facilitates this identification.

SUMMARY OF THE INVENTION

The invention proposes a honeycomb structure bounded by a lateral surface and upstream and downstream faces, said honeycomb structure comprising a set of adjacent channels, each channel emerging vie upstream and downstream openings on said upstream and downstream faces, respectively, so that said set of channels forms upstream and downstream patterns on said upstream and downstream faces, respectively.

According to the invention, at least one of the upstream and downstream faces bears an error-proofing mark making it impossible for any of the upstream and downstream patterns to be completely superimposed one on the other, the outer perimeter of the upstream and/or downstream pattern being symmetrical or having an asymmetry extending over fewer than 10 channels, or fewer than 5 or even fewer than 3 channels.

In other words, if it is tried to superimpose the upstream and downstream patterns, it is impossible to find a position of these patterns such that
- the upstream pattern does not project, at any point, beyond the downstream pattern; and
- the downstream pattern does not project, at any point, beyond the upstream pattern.

As will be seen in greater detail in the rest of the description, simple observation of one of the upstream and downstream faces makes it possible to detect the presence or absence of the error-proofing mark and therefore to identity the observed face rapidly and reliably.

In addition, the error-proofing mark results by definition from a shaped feature of the honeycomb structure. There is therefore no risk of the error-proofing mark being erased, as is the case for example for an ink.

The feature whereby the outer perimeter of the upstream and/or downstream pattern, when it is asymmetric, has an asymmetry that extends over fewer than 10 or fewer than 5 or even fewer than 3 channels, means that the outer perimeter is symmetrical if that portion of the perimeter bounded by said channels is not considered.

A honeycomb structure according to the invention may comprise one or more of the following optional features;
- at least one of the upstream and downstream patterns has no axis of symmetry. Preferably, none of these patterns has an axis of symmetry;
- the error-proofing mark extends over fewer than 50, fewer than 30, fewer than 20, fewer than 15, fewer than 10, fewer than 5 channels or even over a single channel. The area of the error-proofing mark on said at least one of the upstream and/or downstream faces represents less than 10%, less than 5%, less than 3% or even less than 1% of the area of said face;
- the error-proofing mark extends on to the periphery, or even exclusively on to the periphery, of the honeycomb structure;
- the error-proofing mark extends, from said at least one of the upstream and downstream faces, over a depth of less than 10%, less than 5%, less than 2% or even less than 1% and/or more than 0.1%, more than 0.3% or more than 0.5% of the length (L) of the honeycomb structure;
- the error-proofing mark is maintained, that is to say it remains visible, while the honeycomb structure is being sintered, in particular under the sintering conditions described later;
- the error-proofing mark results from a particular shape of one or more channels in particular, it may result from a particular aspect ratio and in particular from an aspect ratio differing by at least 5%, or even at least 8%, or even at least 12% from the average of the aspect ratios of the other channels;
- the error-proofing mark results from a particular conformation of one or more of the openings, for example from a variation in thickness or from a deformation of the edge of this (these) opening(s); preferably, the error-proofing mark does not create a corner or additional wall in the opening of the channel or channels in question;
- the channel or channels forming the error-proofing mark has (have), at the upstream and/or downstream face, an average wall thickness that differs by at least 10%, preferably by at least 20%, from the average thickness of the other channels;

the channel or channels forming the error-proofing mark has (have), at the upstream and/or downstream face, an average opening area that differs by at least 10%, preferably by at least 20%, or even at least 30% from the average area of the openings of the other channels;

the channel or channels forming the error-proofing mark has (have), at the upstream and/or downstream face, an outer and/or inner perimeter differing from that of the other channels. In particular, the channel or at least one of the channels of the group of channels forming the error-proofing mark may have an asymmetry distinctive from the other channels;

the error-proofing mark is not exclusively provided on the lateral surface of the honeycomb structure or even not provided on said lateral surface;

in at least one cross section, preferably in any cross section, the channels are arranged in the form of rows and columns, each intermediate wall separating two rows or two columns of channels having an undulating shape, the degree of asymmetry, measured in said cross section preferably being less than 40%, preferably less than 30%;

the honeycomb structure has a constant cross section, i.e. one which is identical whatever the cross-sectional plane in question;

a single error-proofing mark may be placed on the upstream face or on the downstream face. Two different error-proofing marks may also be placed on the upstream and downstream faces, respectively;

an error-proofing mark may form a sign indicating a meaning, for example having an arrow or a letter, for example a letter "E" to denote an upstream face;

none of the channels not exposed to the outside of the honeycomb structure, which are called "interior channels", has, either on the upstream face or on the downstream face, an opening area differing by more than 7%, preferably more than 15% and more preferably more than 20% of the opening area of any of the other interior channels. The error-proofing mark is particularly useful in the situation when all the interior channels have openings of substantially the same area. The small difference between the openings makes it difficult in fact to distinguish first channels from the second channels;

none of the channels of the honeycomb structure has, at the upstream face or at the downstream face, an opening area that differs by more than 7%, preferably more than 15% and more preferably more than 20% of the opening area of any one of the other channels;

the channel density is greater than 7.75, greater than 15 and/or less than 100 channels, or less than 60 channels (per $cm^2$ of transverse area, i.e. per $cm^2$ of the upstream face or downstream face);

the number of channels in the honeycomb structure is greater than 100 and/or less then 2000;

the honeycomb structure comprises only through-channels, that is to say channels having no plug liable to impede the flow of a fluid;

the honeycomb structure has a cylindrical external shape, the cross section of which has an area greater than 5 $cm^2$ and/or less than 40 $cm^2$;

the honeycomb structure has a cylindrical external shape of polygonal, in particular square or hexagonal, cross section, the width of one side of said polygonal section being greater than 30 mm and/or less than 100 mm;

the honeycomb structure has an external shape with at least one plane of longitudinal symmetry. The honeycomb structure may especially have a cylindrical shape of round or ellipsoidal cross section, as in the case of the honeycomb structures of certain monolithic filter bodies of the prior art, or of square cross section, as in the case of the honeycomb structures of certain unitary filter blocks of the prior art. For this type of honeycomb structure, the differentiation of the upstream and downstream faces is in fact generally particularly tricky;

the honeycomb structure comprises a sintered material or consists of a sintered material;

the material of the honeycomb structure is a ceramic;

the honeycomb structure consists of a single material (unlike, for example, a filter body assembled by means of a jointing cement of different nature from that of the assembled unitary filter blocks);

the error-proofing mark is made of the same material as the rest of the honeycomb structure;

the honeycomb structure is an extruded structure; and the material of the honeycomb structure has a total porosity of greater than 10%, preferably greater than 30%, or even greater than 40%, or even greater than 50% and/or less than 80% or less than 70%.

In one embodiment, a honeycomb structure according to the invention comprises imbricated sets of first and second adjacent channels, these being arranged so as to form, in cross section, a preferably regular pattern, more preferably a checkerboard pattern:

the cumulative total volume of said first channels being greater than that of said second channels; and/or the cumulative total area of the openings of the first channels on at least one of the upstream and downstream faces being greater than that of the openings of the second channels on the other of said upstream and downstream faces; and/or the first channels having a preferably constant first cross section, the second channels having a preferably constant second cross section, and the first cross section being different from the second cross section.

A "regular pattern" is a pattern in which the first and se and channels are always arranged in the same way with respect to one another, whatever the zone in question of the pattern. An alternating arrangement of the first and second channels over the height and over the width of a filter element thus forms a regular pattern in the form of a checkerboard.

Such a honeycomb structure according to the invention may also have one or more of the following optional features:

the cross sections of the first channels and/or of the second channels are constant along said channels;

said first and second channels are straight and parallel;

the ratio r of the cumulative total volume Ve of the first channels to the cumulative total volume Vs of the second channels is greater than 1.03, greater than 1.10, greater than 1.15 and/or less than 3, less than 2.5, preferably less than 2;

the ratio r' of the cumulative total internal area of the first channels to the cumulative total internal area of the second channels is greater than 1.03, greater than 1.10, greater than 1.15 and/or less than 3, less than 2.5, preferably less than 2;

the ratio of the average hydraulic diameter of the first channels (i.e. over all these channels) to the average hydraulic diameter of the second channels is greater than 1.03, greater than 1.10, greater than 1.15 and/or less than 1.8, less than 1.3, preferably less than 1.2;

preferably, the degree of asymmetry, measured on at least one of the upstream and downstream faces, is less than 30%, preferably less than or equal to 20% and even more preferably less than or equal to 15%;

at least one of the upstream and downstream faces, preferably each of the upstream and downstream faces, has a flat general shape. Thus, for example, no channel opens into the bottom of a slot which will be provided on one of these faces. The presence of the error-proofing mark modifies by less than 10%, less than 5%, less than 3% or less than 1%, the total wall area separating the first channels from the second channels. This area corresponds, in the case of a structure intended for filtration, to the area through which the fluid to be filtered passes when it is between the first and second channels.

Such a honeycomb structure according to the invention may especially be used to manufacture a monolithic filler body or a unitary filter block intended to be assembled so as to form an assembled filter body. The first and second channels are then plugged on the downstream and upstream faces, respectively, thus becoming net and outlet channels, respectively. "Filter element" is general according to the invention a monolithic filter body or a unitary filter block.

A filter element according to the invention may especially comprise imbricated sets of adjacent first and second channels which extend from an upstream face to a downstream face of said filter element, each first channel opening via an upstream opening on to the upstream face and being plugged on the downstream face, and each second channel opening via a downstream opening on to the downstream face and being plugged on the upstream face.

As will be seen below, the plugs may advantageously be used to make it easier to distinguish the upstream face from the downstream face.

In one particular embodiment, the number of first channels of a filter element is different from the number of second channels.

Preferably, the number of first channels differs by fewer than 20%, fewer than 10%, fewer than 5% or even fewer than 1% of the number of second channels.

In one particular embodiment, the Imbricated sets of first and second adjacent channels form, on at least one of the upstream and downstream faces, preferably on the upstream and downstream faces, a regular pattern, preferably a checkerboard pattern, except in at least one zone called an "irregular" zone. In this irregular zone, regularity in the arrangement of the first and second channels is therefore interrupted.

Preferably, a filter element according to the invention comprises fewer than 30, fewer than 20, fewer than 10, fewer than 5 or even fewer than 2 irregular zones, preferably only one irregular zone. Preferably, an irregular zone covers less than 30, less than 20, less than 10, less than 5 or less than 2 channels, preferably only one channel.

In one embodiment, the creation of an irregular zone results in an inversion of the type of one channel, one channel which, depending on the regular pattern, would have to be a "first" channel being a "second" channel. In a checkerboard pattern, such an irregular zone may lead to the appearance of a cross formed by plugs on one of the upstream and downstream faces and of a cross formed by openings on the other of the upstream and downstream faces.

In this embodiment, the irregular zone extends only over a single channel and, advantageously, therefore cannot substantially disturb the operation of the filter element.

The filter element may especially have a cylindrical external shape of polygonal or rounded, for example circular or ellipsoidal, cross section.

In one embodiment, an irregular zone may cover an interior channel.

When the filter element is a unitary filter block, it is however preferable for an irregular zone to cover only peripheral channels. The latter, in contact with the cement after assembly, therefore have a filtration efficiency lower than that of the interior channels. The creation of an irregular zone covering one or more peripheral channels therefore results in a lower reduction in the efficiency of filtration of the assembled filter body.

In one particular embodiment, the filter element has a cylindrical external shape of polygonal cross section and, on at least one of the lateral faces of the honeycomb structure, the number of peripheral channels is odd.

Therefore the alternate plugging of the channels results, on only one of the two upstream and downstream faces, in the plugging of the two peripheral channels at the ends of this lateral face, that is to say the two corner channels of this lateral face. It thus becomes easy to distinguish the upstream face from the downstream face.

An odd number of peripheral channels along a lateral face may result in a number of inlet channels or outlet channels which is larger than the number of outlet channels or inlet channels, respectively. Such a feature would therefore be considered as contrary to performance optimization. However, the inventors have found that the difference between the number of inlet and outlet channels is insignificant and has no measurable effect.

In one embodiment, over at least two of the lateral faces of the honeycomb structure, preferably on all the lateral faces of the honeycomb structure, the number of peripheral channels is odd.

The honeycomb structure may in particular have a cylindrical external shape of rectangular, square or hexagonal cross section. The width of one side of said cross section may especially be greater than 30 mm and/or less than 100 mm.

The invention also relates to an extrusion die that has a checkered flow cross section that has no axis of symmetry.

The checkering enables the honeycomb structure to be manufactured by extrusion. With such checkering, the absence of an axis of symmetry makes it possible to obtain by simple extrusion, a honeycomb structure according to the invention.

An extrusion die may also be designed to be able to obtain, by simple extrusion, one or more of the optional features of a honeycomb structure according to the invention.

The invention also relates to a method that includes a step of positioning a honeycomb structure according to the invention, in which method the upstream and/or downstream faces are identified by observing the error-proofing mark on said honeycomb structure and the honeycomb structure is positioned according to said identification.

The positioning may be carried out so as to orient the honeycomb structure along the longitudinal direction and/or around said longitudinal direction.

This method may especially be chosen from:
  a method of plugging the channels of said honeycomb structure;
  a method of cleaning said honeycomb structure, especially so as to remove, partly or completely, residual ash;
  a method of applying a catalytic coating on said honeycomb structure;
  a method of applying a peripheral coating, especially made of a thermally insulating coating cement which is impermeable to the exhaust gas;

a method of mounting a filter body comprising a honeycomb structure according to the invention in an exhaust line of an automobile or in a casing intended for such an exhaust line;

a method of assembling a plurality of unitary filter blocks comprising a honeycomb structure according to the invention, so as to constitute an assembled filter body. Identification of the upstream and/or downstream faces may advantageously be automated, especially for large-scale industrial production.

The invention also relates to the use of a honeycomb structure according to the invention for pollution control of the exhaust gas, in particular from an internal combustion engine of an automobile, and to the use of such a structure in a heat exchanger.

The invention also relates to a process for manufacturing a honeycomb structure, comprising the following successive steps:

a) extrusion of a ceramic through a die so as to form a honeycomb preform; and b) drying and sintering of said preform so as to obtain a sintered honeycomb structure.

In one embodiment, the die is an extrusion die according to the invention. In this case, the preform constitutes a honeycomb structure according to the invention.

In one embodiment, before or after sintering, preferably before sintering, an error-proofing mark is provided by deformation and/or removal and/or addition of material.

Use of an extrusion die according to the invention is preferred as it avoids having to use a specific forming tool, for example for locally deforming a channel or a group of channels. Furthermore, it does not require an additional step in the manufacturing process.

The die may be a one-piece die designed to produce the error-proofing mark during extrusion.

In one embodiment, an obturating frame or wedge for the die is positioned, downstream of the die, in order to produce the error-proofing mark during extrusion. Advantageously, the same the can thus serve for manufacturing a honeycomb structure according to the invention or a honeycomb structure not according to the invention, depending on whether it is provided with said obturating frame or wedge.

The preform for a sintered honeycomb structure manufactured according to a method according to the invention by means of a die according to the invention is itself a honeycomb structure according to the invention.

The invention also relates to a process for manufacturing a filter element, comprising the following successive steps:

a') extrusion of a ceramic through a die so as to form a honeycomb preform;

b') drying and sintering of said preform to obtain a sintered honeycomb structure; and c') plugging of the channels of said sintered honeycomb structure so as to obtain, systematically, a filter element according to the invention.

Steps a') and b') may especially be steps a) and b), respectively.

In one embodiment, the channels are plugged before the sintering operation.

A honeycomb structure according to the invention, preferably in the form of a filter element according to the invention, may be assembled with other honeycomb structures, preferably according to the invention, for example by interposing continuous or noncontinuous joints, in order to manufacture an assembled body.

The invention therefore also relates to an assembled body noteworthy in that it comprises at least one honeycomb structure according to the invention.

Finally, the invention relates to a heat exchanger, to a unitary filter block, to an assembled filter body and to a monolithic filter body, in particular intended for a particulate filter, noteworthy in that they comprise at least one honeycomb structure according to the invention.

Preferably, the channels of the unitary filter block, of the assembled filter body or of the monolithic filter body according to the invention are alternately plugged on the upstream face and on the downstream face.

In one embodiment, the channels are arranged relative to one another so that the integrality of a fluid entering one channel via the upstream face leaves the downstream face via channels adjacent said channel.

An assembled filter body may comprise one or more unitary filter blocks according to the invention. The error-proofing marks of these unitary filter blocks may be the same or different. In one embodiment, only one unitary filter block bears an error-proofing mark, thereby limiting the pressure drop.

DEFINITIONS

The term "hydraulic diameter" of a cross section or of a channel is understood to mean the ratio of four times the cross section of the channel to the circumference of the channel.

The term "degree of asymmetry" of a honeycomb structure comprising first and second channels is understood to mean the ratio of the volume of the first channels to the volume of the second channels. In a monolithic filter body or a unitary filter block intended to be assembled so as to form an assembled filter body, the first and second channels may in particular correspond to net channels and outlet channels, respectively.

The term "aspect ratio" is understood to mean the square root of $4\pi \times$cross section/circumference of a channel.

The term "outer perimeter of a channel" is understood to mean the line which, in a cross-sectional plane, defines the outer boundary of this channel (relative to the axis of the channel). The term "inner perimeter of a channel" is understood to mean the line which, in a cross-sectional plane, defines the boundary of the internal volume of this channel.

Likewise, the expression "outer perimeter of a honeycomb structure" is understood to mean the line which, in a cross-sectional plane, defines the outer boundary of this structure.

The expression "average opening area" of a group of channels is understood to mean the average of the areas of the openings of the channels of this group.

Unless otherwise indicated, all the averages are arithmetic averages.

A cross-sectional plane is a plane perpendicular to the longitudinal direction of a structure. In a honeycomb structure, the channels of which are all parallel, a cross-sectional plane is a plane perpendicular to the direction of these channels.

A longitudinal plane is a plane that includes the longitudinal direction (C-C or D-D in the figures).

The expression "comprising a" should be understood to include "comprising at least one", unless otherwise indicated.

BRIEF DESCRIPTION OF THE DRAWINGS

The description that follows, given with reference to the appended drawings, will enable the advantages of the invention to be better understood and appreciated. In these drawings:

FIG. 1 shows schematically, in perspective, an assembled filter body;

FIG. 2 shows schematically, in perspective, a unitary filter block of the assembled filter body shown in FIG. 1;

FIG. 3 shows schematically, in perspective, a monolithic filter body;

In these nonlimiting figures, the various elements have not necessarily been drawn to the same scale. Identical references have been used in the various figures to denote identical or similar elements.

Figure 4:
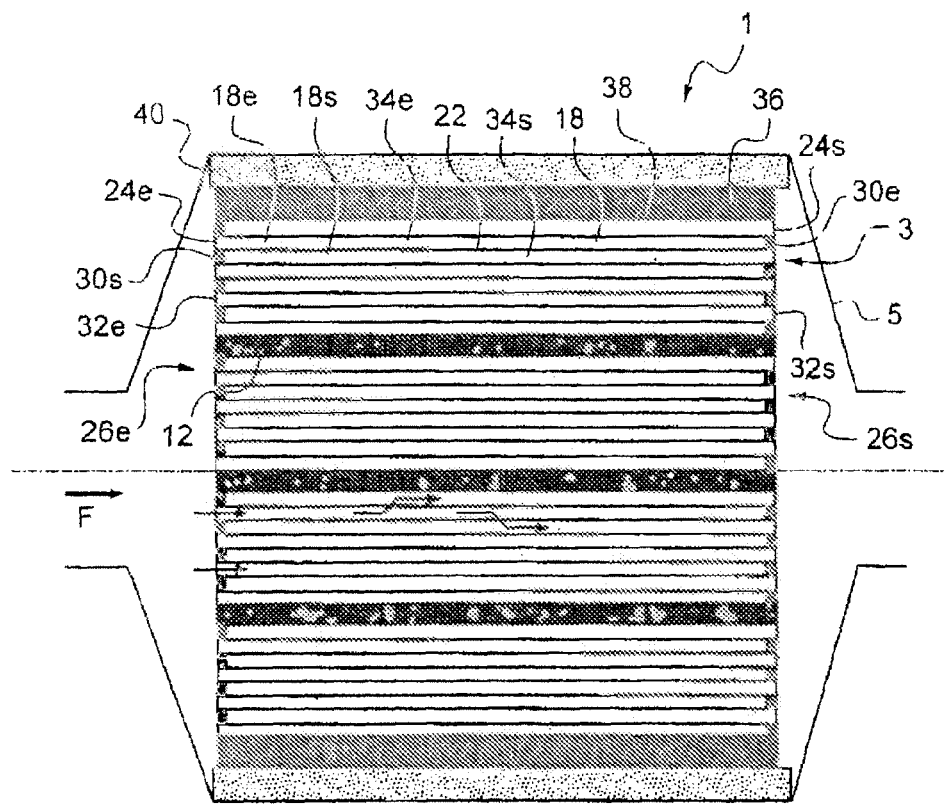
FIG. 4 shows schematically, in longitudinal median cross section, in the plane of section P, the assembled filter body shown in FIG. 1, after canning.

To make the figures clearer, the number of channels represented is very much less than those of the conventional filter blocks or bodies available commercially.

DETAILED DESCRIPTION

Honeycomb Structure

The error-proofing mark of a honeycomb structure is visible by observing one of the upstream and downstream faces seen from the front, that is to say, in FIGS. 1 and 3, by observing these faces along the longitudinal axis C-C of the honeycomb structure (or along the axis D-D in FIG. 2).

FIGS. 1 to 4 have been described in the preamble, the following figures, which provide various examples of upstream and downstream patterns of unitary filter blocks, are now described. The examples relate to cylindrical unitary filter blocks of square base, called "parallelepipedal blocks", which are intended to be assembled to form a filter body, as described above. The invention however is not limited to such blocks.

FIGS. 5 to 15 relate to a unitary filter block 11 such as that shown in FIG. 2, which comprises sets of adjacent inlet channels 18e and outlet channels 18s, arranged relative to one another so that the entirety of the gas filtered by any inlet channel passes into outlet channels adjacent to said inlet channel. Thus, there are no zones of one or more inlet channels that open into another inlet channel, which zones cannot be used for filtration. The filtration area (i.e. the useful area of the walls of the inlet channels) available for a given volume of honeycomb structure is thereby optimized.

The inlet channels 18e and outlet channels 18s are parallel and straight over the length L of the unitary filter block. They all have a constant cross section over this length L. Advantageously, it is thus possible to manufacture by extrusion the honeycomb structure suitable for manufacturing the unitary filter block 11. The upstream and downstream patterns therefore correspond here to cross sections of the unitary filter block 11, the observer looking from the upstream or downstream side of these sections, respectively.

The sets of inlet channels and outlet channels are imbricated one in another so as to form, in cross section, a checkerboard pattern in which said inlet channels alternate with said outlet channels, in the height direction of the page and in the width direction thereof.

The inlet channels have a larger cross section than the outlet channels so as to increase the volume available for storing the residues. Advantageously, the frequency of cleaning the filter is thereby reduced.

For this purpose, the walls of the inlet channels are "deformed" in order to increase the overall volume of the inlet channels at the expense of that at the outlet channels. For example, these walls may be concave on the side facing an inlet channel and convex on the side facing the outlet channels that are adjacent thereto.

The intermediate was 42 and 44 separating two horizontal rows (line 19) or two vertical rows (columns 20) of channels, respectively (the vertical direction being defined by the lateral edge of the sheet), thus have, in cross section, an undulating or "wavy" shape, the intermediate wall undulating substantially with a half wavelength over the width of a channel. The term "length" of a wave refers to the distance separating two points of this wave that are located at the same height, with the same sense of slope variation. In the case of a periodic wave, the "length" of the wave is called the "period".

Preferably, the wave is periodic, but the amplitude of the waves may be constant or variable. Preferably, this amplitude is constant. Also preferably, the wave has a sinusoidal shape, the half-period of which is equal to the pitch "p" of the array of channels (see FIG. 5b) or a succession of adjacent circular arcs, each arc having a length equal to the pitch "p".

As a last preference, all the intermediate walls 42 of the unitary filter block, extending vertically or horizontally, have in cross section the same shape of wave.

The "degree of asymmetry" of a wavy structure denotes the ratio of the amplitude "h," to the half-length of said wave, that is to say, in the case of a periodic wave, the ratio of the amplitude "$h_w$" to the half-period. Preferably, the degree of asymmetry is less than 40%, preferably less than 30%, preferably less than 20%, even more preferably less than or equal to 10%. Advantageously, the pressure drop induced by the unitary filter block after soot accumulation is thus substantially reduced and the frequency of regenerating the filter body is therefore limited.

With this asymmetric configuration of the channels, the cumulative total volume of the inlet channels is greater than that of the outlet channels and the cumulative total area of the openings of the inlet channels on the upstream face, that is to say the sum of the areas of these openings, is greater than that of the openings of the outlet channels on the downstream face.

For optimum efficiency, the ratio r of the cumulative total volume Ve of the net channels to the cumulative total volume Vs of the outlet channels or the ratio r' of the cumulative total internal area of the net channels to the cumulative total internal area of the outlet channel is however, preferably, greater than 1.03, greater than 1.10, greater than 1.15 and/or less than 3, less than 2.5, preferably less than 2.

Figure 5A:
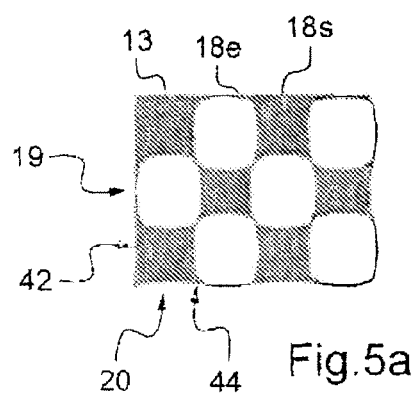
FIGS. 5 to 15 show schematically parts of the upstream patterns (figures with the suffix "a") and downstream (figures with the suffix "b") of various honeycomb structures according to the prior art (FIGS. 5a and 5b) and according to the invention (the following figures). The positions of these parts of the patterns are referenced by "a" and "b" in FIG. 2.
Figure 5B:
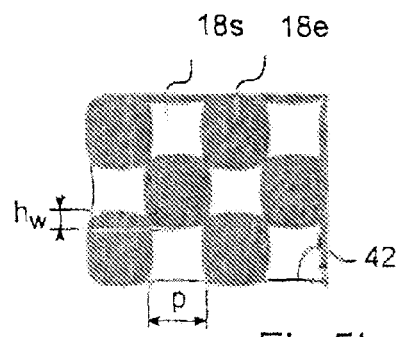

It may be difficult to identify the upstream and downstream faces when the shape of the openings of the inlet channels is close to that of the outlet channels, as in FIGS. 5a and 5b. An error-proofing mark M is then particularly useful.

In the various embodiments shown, neither the upstream pattern nor the downstream pattern has an axis of symmetry. It is therefore impossible for the upstream and downstream patterns to be superimposed.

The error-proofing mark M may extend over one or more channels, in particular, it may extend over fewer than 50, fewer than 30, fewer than 20, fewer than 10 or fewer than 5 channels, or even over a single channel. Advantageously, the mark therefore does not or does not substantially affect the flow of gas through the filter body and especially the pressure drop caused by passing through the filter body.

The error-proofing mark M may extend over one or more channels chosen exclusively from the group of peripheral channels, from the group of corner channels and from the group of interior channels. In one embodiment, the error-proofing mark extends over one or more channels exclusively chosen from the group of peripheral channels, or even exclusively from the group of corner channels. Preferably, it extends over a single peripheral or corner channel.

If the error-proofing mark is provided on a single corner channel, it must not be symmetrical with respect to the bisector of this corner if the unitary filter block is itself symmetrical with respect to this bisector. This is why, in the embodiments shown, which relate to unitary filter blocks of square cross section, the error-proofing mark has not been provided in a corner channel.

Putting the error proofing mark M on the periphery of the honeycomb structure, and in particular on a owner channel of this structure, advantageously facilitates the manufacture thereof. An obturating wedge or frame may in fact be easily positioned on the extrusion die in order to create the error-proofing mark during extrusion.

Figure 16A:
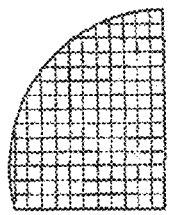
FIGS. 16 and 17 show schematically upstream patterns (figures with the suffix "a") and downstream patterns (figures with the suffix "b") of honeycomb structures outside the invention and according to the invention, respectively.
Figure 16B:
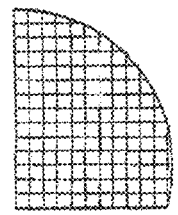

FIGS. 16a and 16b represent the downstream faces of a honeycomb structure according to the invention. Admittedly, this honeycomb structure has an error-proofing mark since its external perimeter is asymmetric. However, this error-proofing mark extends over more than 10 channels.

Figure 17A:
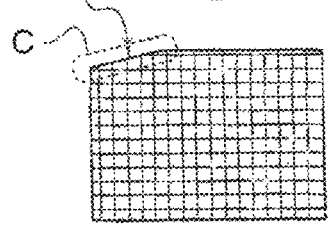
Figure 17B:
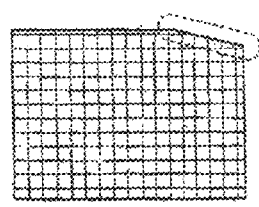

In contrast, in FIGS. 17a and 17b, the error-proofing mark extends over fewer than 10 channels. In these figures, the channels in question have been circled (circle C).

The error-proofing mark may result from one particular shape of one or more channels, in particular, it may result from a particular aspect ratio, and in particular from an aspect ratio differing by at least 3%, et least 6% or even at least 8%, or even at least 12% of the average of the aspect ratios of the other channels.

The error-proofing mark may result from a particular configuration of one or more inlet and/or outlet openings, for example of a variation in thickness or from a deformation of the preform, especially by constricting or widening this or these opening(s).

Figure 6A:
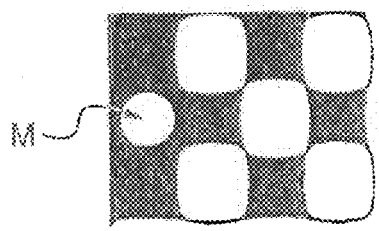
Figure 6B:
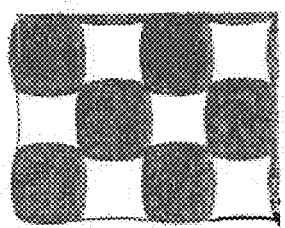

Preferably, creating the error-proofing mark does not create an additional corner in the opening of the channel or channels in question. On the contrary, the error-proofing mark may result from omitting a corner in the opening of the channel or channels in question, for example by circularization of this opening. A circular opening or one having an at least partly rounded edge may especially constitute an error-proofing mark, as shown in FIGS. 6a and 6b. Advantageously, in an application for an automobile filter, this configuration does not modify, or even reduce, the thermomechanical stresses undergone by the filter body during its use.

In one embodiment, the channel or the group of channels forming the error-proofing mark has, at the upstream and/or downstream face, an average wall thickness that differs by at least 10%, preferably at least 20%, of the average thickness of the other channels.

Figure 8A:
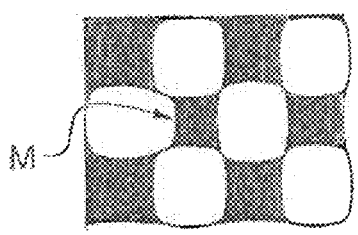
Figure 8B:
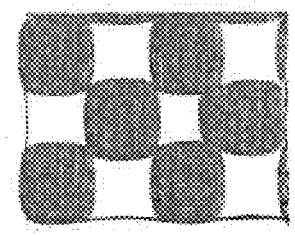
Figure 9A:
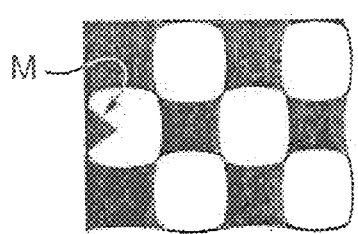
Figure 9B:
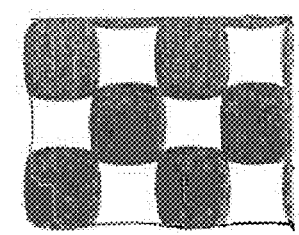
Figure 10A:
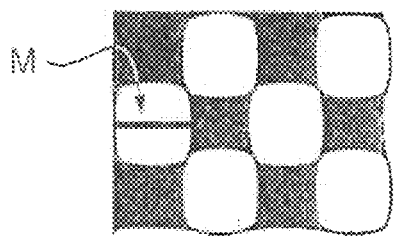
Figure 10B:
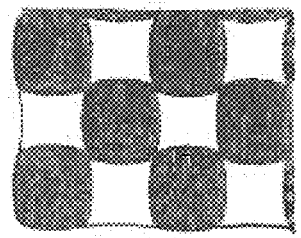
Figure 11A:
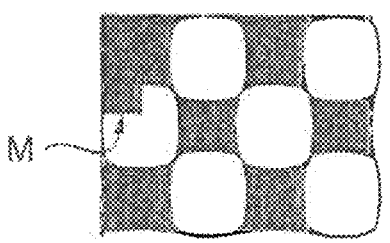
Figure 11B:
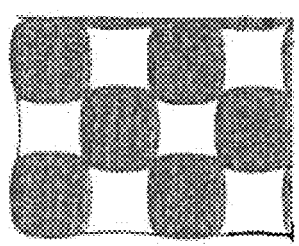
Figure 12A:
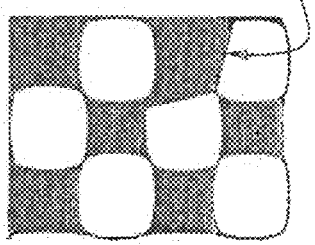
Figure 12B:
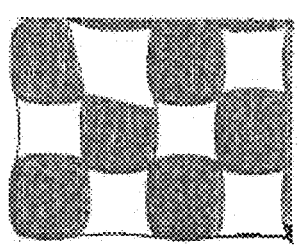
Figure 13A:
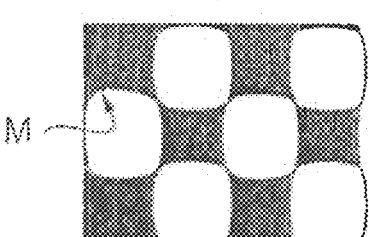
Figure 13B:
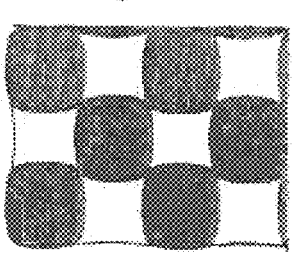
Figure 14A:
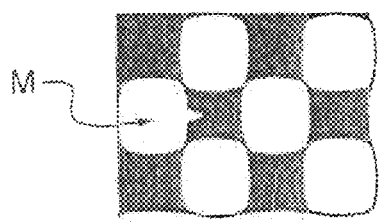
Figure 14B:
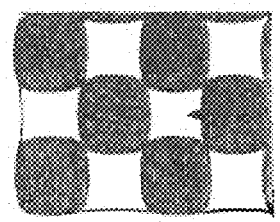

In one embodiment, the channel or the group of channels forming the error-proofing mark has, on the upstream and/or downstream face, an average opening area that differs by at least 10%, preferably at least 20% or even at least 30% of the average area of the openings of the other channels (see FIGS. 8a and 8b).

In one embodiment, the deformation of an opening of a channel corresponds to deformation of an opening of an adjacent channel, as in FIGS. 8a and 8b or 14a and 14b. When the cross section is constant, the two, upstream and downstream, patterns are then affected by the provision of the error-proofing mark. The same applies for an error-proofing mark provided on the lateral surface of the honeycomb structure (FIGS. 7a and 7b).

The error-proofing mark may result from adding materials (see for example FIGS. 9a and 9b), for example by adding a partition (FIGS. 10a an 10b), or by removing material in the channels in question.

Figure 7A:
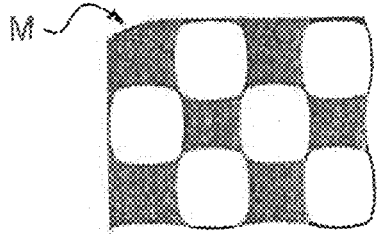
Figure 7B:
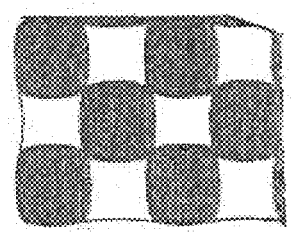

The error-proofing mark may also result from a modification of the outer perimeter of the honeycomb structure, as shown in FIGS. 7a and 7b. However, it is preferable for the error-proofing mark not to result, or to not result only, from the modification of this perimeter. In other words, it is not exclusively provided on the lateral surface 13 of the honeycomb structure. Thus, it remains visible if this lateral surface is modified, especially by applying a peripheral mating or a jointing cement.

Figure 15A:
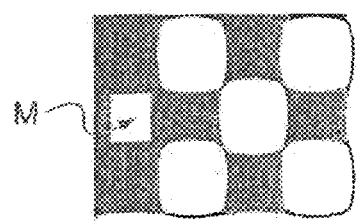
Figure 15B:
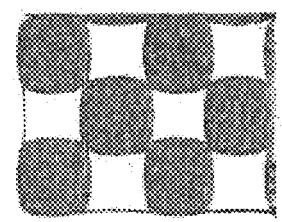

In one embodiment, the channel or the group of channels forming the error-proofing mark has, on the upstream and/or downstream face, an outer perimeter and/or an inner perimeter that differ from those of the other channels. In particular the channel or at least one of the channels of the group of channels forming the error-proofing mark, may have an asymmetry or a shape which distinguishes it from the other channels. FIGS. 15a and 15b show an illustrative example comprising an error-proofing mark in the form of a channel of square section in a honeycomb structure otherwise comprising only wavy channels.

Of course, the various embodiments described here may be optionally combined.

Manufacturing Process

A honeycomb structure according to the invention may be manufactured by all the techniques currently employed.

In one embodiment, a honeycomb preform is marked during a specific step, after extrusion. For example, one or more channels of the preform may be locally squashed, pinched or enlarged. Advantageously, the addition of an error-proofing mark requires no additional consumption of material. Furthermore, the error-proofing mark may be local, for example it may extend only over the opening of one or more inlet channels. In particular, it is not essential to modify the honeycomb structure over the entire length thereof in order to add an error-proofing mark thereto.

In one embodiment, the error-proofing mark may be created after the preform has been sintered, for example by machining. M particular, t is possible to chamfer a corner or an edge of the honeycomb structure.

Preferably, steps a) and b) described above may be carried out using an extrusion die according to the invention. The honeycomb structure has a constant cross section, and an error-proofing mark is made from the same material as the preform. Advantageously, this thus avoids having to use a specific shaping tool. Furthermore, this process does not require an additional step in the manufacturing process, which is particularly advantageous in particular in relation to a process involving incrustation by laser ablation. Furthermore, the latter technology is costly.

Finally, an extrusion the may advantageously be easily manufactured using a conventional the by placing an obturating frame or wedge, downstream of the die, in order to produce the error-proofing mark during extrusion.

Steps a) and b) are steps usually carried out for manufacturing conventional honeycomb structures. These steps are for example described in the patent applications EP 816 065, EP 1 142 619, EP 1 455 923, WO 2004/090294 or WO 2005/063462. The sintering conditions are adapted according to the materials used.

The sintering temperature is preferably above 1300° C., preferably above 1600° C., preferably above 1800° C. and/or below 2400° C., preferably below 2350° C.

Application to a Filter Body

A honeycomb structure according to the invention is particularly useful for manufacturing a monolithic filter body or a filter block intended to be assembled in order to form an assembled filter body.

For this purpose, the openings of certain channels must be plugged on the downstream face in order to constitute net channels and the openings of the other channels must be plugged on the upstream face to constitute outlet channels. The plugging operation may require modifying the process according to the type of channel to be plugged, in particular depending on its cross section or its shape. It is then essential to be able to identify the upstream lace and the downstream face.

This identification may be difficult when the openings of the net channels are similar to those of the outlet channels.

In modern processes for the mass production of filter bodies, a camera is used for this identification. Such an identification device is however expensive and requires an additional step.

Furthermore, if the difference between the shape of the openings of the net channels and that of the outlet channels is barely perceptible, identification errors are possible.

Finally, the variability of the extrusion process leads to variations in the shape of the channels that may also produce identification errors. These identification errors lead to the wrong opening of the channels being plugged or to plugs of poor quality being produced. The filter body must therefore be scrapped. The error-proofing mark of a honeycomb structure according to the invention is therefore particularly useful.

In one embodiment, part of the honeycomb structure is coated with a catalytic coating, or wash coat, for example adapted for the treatment of polluting gases of the CO, HC or NOx type. For example, for optimum performance the wash coat may be applied only to the surfaces defining part of the channels, for example only the surfaces defining the net channels of a lifter body. During application of the wash coat, it is therefore essential to identify the faces of the honeycomb structure. The honeycomb structure according to the invention is well suited for this purpose.

When a filter body has to be mounted on an exhaust line, it is also important that it be properly oriented with respect to the flow of gas to be filtered or be pollution-controlled. The risk of a nonconforming pressure drop or a nonconforming volume of storing soot and residues is thus limited. Also limited is the risk of regeneration regulation errors and of overconsumption of fuel.

As explained above, the error-proofing mark preferably does not result from just the modification of the outer perimeter of the filter body. Unlike a mark applied exclusively to the lateral surface of the filter body, it does not run the risk of being erased or made invisible by applying a peripheral coating to this lateral surface.

This feature is also advantageous when the filter body is placed in a can before the latter is mounted on the exhaust line, in particular when the can has no indication enabling the direction of flow of the exhaust gas through the filter body to be identified.

The error-proofing mark of a filter body according to the invention thus advantageously allows the masking of the lateral surface of the filter body by a wash coat, peripheral coating or a can. The error-proofing mark thus constitutes reliable means for differentiating the upstream faces from the downstream faces.

A honeycomb structure according to the invention also has specific advantages in the context of manufacturing an assembled filter body.

Preferably, the error-proofing mark does not result just from modifying the outer perimeter of the unitary filter block of the assembled filter body. There is therefore no risk of being masked during the assembly operation by applying the jointing cement. During bonding of the unitary filter blocks, all the entry faces of the unitary filter blocks must be placed on the same side. The error-proofing mark allows the risk of a positioning error to be effectively reduced.

In one embodiment, the error-proofing mark is designed to also allow one particular region of the honeycomb structure to be identified, for example one or more faces of a unitary filter block. This embodiment is particularly useful when the unitary filter block has to be oriented not only along the longitudinal direction but also along another direction, for example because one specified lateral face of the unitary filter block must be identified in order to be bonded to another specified lateral face of another unitary filter block, or because it is necessary to distinguish only the zones of the lateral surface of the unitary filter block that have to be bonded. In this embodiment, the error-proofing mark enables an angular position around the longitudinal axis to be identified.

Preferably, during assembly of the unitary filter blocks, transparent masks are applied to the upstream and downstream faces of these blocks so as to prevent the channels from being blocked by the jointing cement, while still enabling the error-proofing mark to be observed.

As is now dearly apparent, a honeycomb structure according to the invention has an error-proofing mark which, in an application for a filter body, does not disappear upon use. The external cleaning operations, especially for moving, partly or completely, the residual ash and recycling operations are thereby facilitated.

Furthermore, in a preferred embodiment, the error-proofing mark remains visible in the case of application of a jointing cement or of a peripheral coating on the lateral surface of the filter body or in the case of integration of the filter body in a can, especially for being mounted on the exhaust line of a motor vehicle.

Of course, the present invention is not limited to the embodiments described and provided as examples. In particular, the channels do not necessarily have a square cross section.

In other embodiments, the adjacent inlet channels and outlet channels are not arranged with respect to one another so that all of the gas filtered by any one inlet channel passes through outlet channels adjacent to said inlet channel.

The invention claimed is:

1. A honeycomb structure (3; 11) comprising a set of adjacent channels, each channel emerging via upstream (32e) and downstream (32s) openings on upstream (26e) and downstream (26s) faces, respectively, wherein so that said set of channels forms upstream and downstream patterns on said upstream and downstream faces, respectively, wherein at least one of the upstream and downstream faces bears an error-proofing mark (M) extending over fewer than 50 channels and making it impossible for any of the upstream and downstream patterns to be completely superimposed one on the other, the outer perimeter of the upstream and/or downstream pattern being symmetrical or having an asymmetry extending over fewer than 10 channels.

2. The honeycomb structure as claimed in claim 1, in which at least one of the upstream and downstream patterns has no axis of symmetry.

3. The honeycomb structure as claimed in claim 1, in which the error-proofing mark (M) extends over fewer than 10 channels.

4. The honeycomb structure as claimed in claim 1, in which the error-proofing mark extends on to the periphery of the honeycomb structure.

5. The honeycomb structure as claimed in claim 1, in which the error-proofing mark results from a particular conformation of one or more of the openings of the channels.

6. The honeycomb structure as claimed in any one of the claim 1, in which the channel or channels forming the error-proofing mark has or have:
- aspect ratio differing by at least 5% from the average of the aspect ratios of the other channels; and/or
- at the upstream and/or downstream face, an average wall thickness that differs by at least 10% from the average thickness of the other channels; and/or
- at the upstream and/or downstream face, an average opening area that differs by at least 10% from the average area of the openings of the other channel; and/or
- at the upstream and/or downstream face, a distinctive asymmetry.

7. The honeycomb structure as claimed in claim 1 said honeycomb structure having a lateral surface (13) and the error-proofing mark not being exclusively provided on said lateral surface.

8. The honeycomb structure as claimed in claim 1, comprising a sintered material and having an external shape with at least one plane of longitudinal symmetry.

9. The honeycomb structure as claimed in claim 1, having a cylindrical external shape of square cross section, the width of said section being greater than 30 mm but less than 100 mm.

10. The honeycomb structure as claimed in claim 1 comprising imbricated sets of first and second adjacent channels, arranged alternately so as to form, in cross section, a checkerboard pattern, in which:
- the ratio r of the cumulative total volume Ve of the first channels to the cumulative total volume Vs of the second channels is greater than 1.03 but less than 3.0; and/or
- the ratio r' of the cumulative total internal area of the first channels to the cumulative total internal area of the second channels is greater than 1.03 but less than 3.0.

11. The honeycomb structure as claimed claim 1, in which the walls of the channels are concave on the side with the first channels and convex on the side with the second channels.

12. The honeycomb structure as claimed in claim 11, in which, in any cross section, each intermediate wall separating two rows or two columns of channels has an undulating shape, the degree of asymmetry, measured on in said cross section, being less than 30%.

13. The honeycomb structure as claimed in claim 1, having a cylindrical external shape of polygonal cross section and such that, on at least one of the lateral faces of said honeycomb structure, the number of peripheral channels is odd.

14. A method comprising a step of positioning a honeycomb structure as claimed in claim 1, chosen from:
- a method of plugging the channels of said honeycomb structure;
- a method of cleaning said honeycomb structure so as to remove, partly or completely, residual ash;
- a method of applying a catalytic coating on said honeycomb structure;
- a method of applying a peripheral coating, especially made of a thermally insulating coating cement which is impermeable to the exhaust gas;
- a method of mounting a filter body comprising said honeycomb structure in an exhaust line of an automobile or in a casing of a filter body intended for such an exhaust line;
- a method of assembling a plurality of unitary filter blocks, at least one of said unitary filter blocks comprising said honeycomb structure, so as to constitute an assembled filter body, in which method the entry and/or exit faces are identified by observing the error-proofing mark on said honeycomb structure and positioning said honeycomb structure according to said identification.

15. A device chosen from a heat exchanger, a unitary filter block, an assembled filter body and a monolithic filter body, said device comprising at least one sintered honeycomb structure in accordance with claim 1.

* * * * *

UNITED STATES PATENT AND TRADEMARK OFFICE
CERTIFICATE OF CORRECTION

PATENT NO. : 8,557,011 B2  
APPLICATION NO. : 13/382969  
DATED : October 15, 2013  
INVENTOR(S) : Bernard Bouteiller Page 1 of 1

It is certified that error appears in the above-identified patent and that said Letters Patent is hereby corrected as shown below:

Title Page, item (73) titled Assignee: please delete "General Electric Company" and insert therefor --SAINT-GOBIAN CENTRE DE RECHERCHES ET D'ETUDES EUROPEAN--

Title Page, item (73) titled Assignee: please delete "Schenectady, NY" and insert therefor --Choubevoie, FR--

Signed and Sealed this  
Twenty-eighth Day of April, 2015

Michelle K. Lee  
*Director of the United States Patent and Trademark Office*

UNITED STATES PATENT AND TRADEMARK OFFICE
CERTIFICATE OF CORRECTION

PATENT NO.        : 8,557,011 B2
APPLICATION NO.   : 13/382969
DATED             : October 15, 2013
INVENTOR(S)       : Bernard Bouteiller It is certified that error appears in the above-identified patent and that said Letters Patent is hereby corrected as shown below:

In the specification

Column 1, line 11, please delete "the" and insert therefor --die--.

Column 1, line 23, please insert --L-- between the words length and typically.

Column 1, line 30, please delete "shoals" and insert therefor --shows--.

Column 1, line 40, please delete "the" and insert therefor --die--.

Column 2, line 3, please insert --$O_s$-- between the words observer and observes.

Column 3, line 11, please delete "net" and insert therefor --inlet--.

Column 3, line 16, please delete "net" and insert therefor --inlet--.

Column 3, line 45, please delete "darned" and insert therefor --carried--.

Column 6, line 42, please delete "se and" and insert therefor --second--.

Column 7, line 17, please delete "filler" and insert therefor --filter--.

Column 9, line 41, please delete "the" and insert therefor --die--.

Column 10, line 34, please delete "net" and insert therefor --inlet--.

Column 10, line 37, please delete "circumference" and insert therefor --$circumference^2$--.

Column 11, line 24, please delete "dearer" and insert therefor --clearer--.

Column 12, line 31, please delete ""h,"" and insert therefor --"$h_w$"--.

Column 12, line 55, please delete "dose" and insert therefor --close--.

Signed and Sealed this
Twenty-third Day of February, 2016

Michelle K. Lee
*Director of the United States Patent and Trademark Office*

CERTIFICATE OF CORRECTION (continued)
U.S. Pat. No. 8,557,011 B2

In the specification

Column 13, line 17, please delete "owner" and insert therefor --corner--.

Column 13, line 33, please delete "et least 6%" and insert therefor --at least 5%--.

Column 14, line 15, please delete "mating" and insert therefor --coating--.

Column 14, line 46, please delete "M" and insert therefor --In--.

Column 14, line 59, please delete "the" and insert therefor --die--.

Column 15, line 10, please delete "net" and insert therefor --inlet--.

Column 15, line 16, please delete "lace" and insert therefor --face--.

Column 15, line 25, please delete "net" and insert therefor --inlet--.

Column 15, line 39, please delete "net" and insert therefor --inlet--.

Column 15, line 40, please delete "liufter" and insert therefor --filter--.

In the claims

Column 16, line 30, please delete "dearly" and insert therefor --clearly--.